Mar. 3, 1925.
W. H. EVERS
SHORE PROTECTING SYSTEM
Filed Jan. 3, 1922
1,528,016
4 Sheets-Sheet 1
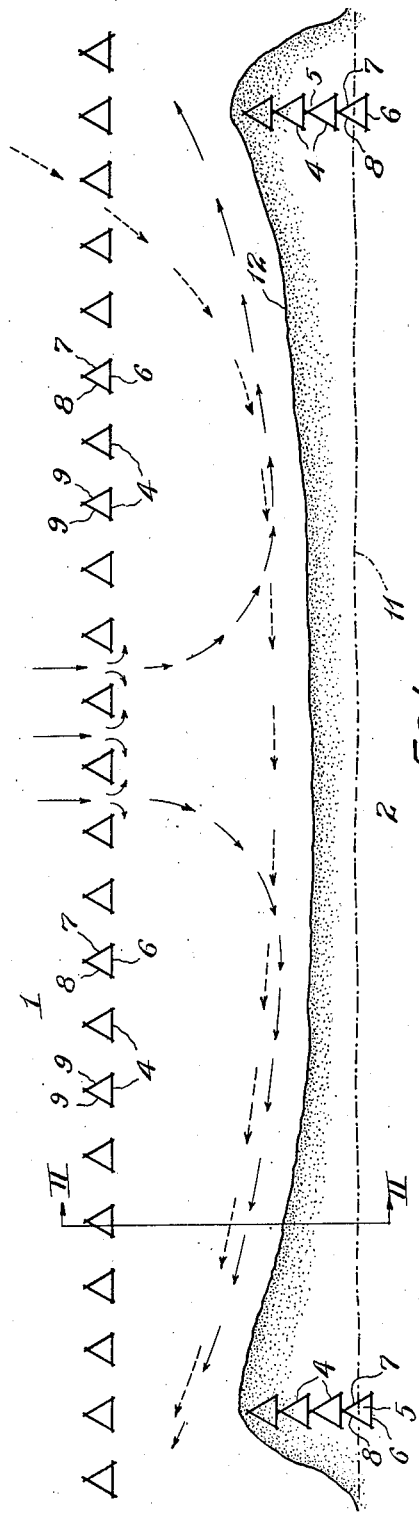
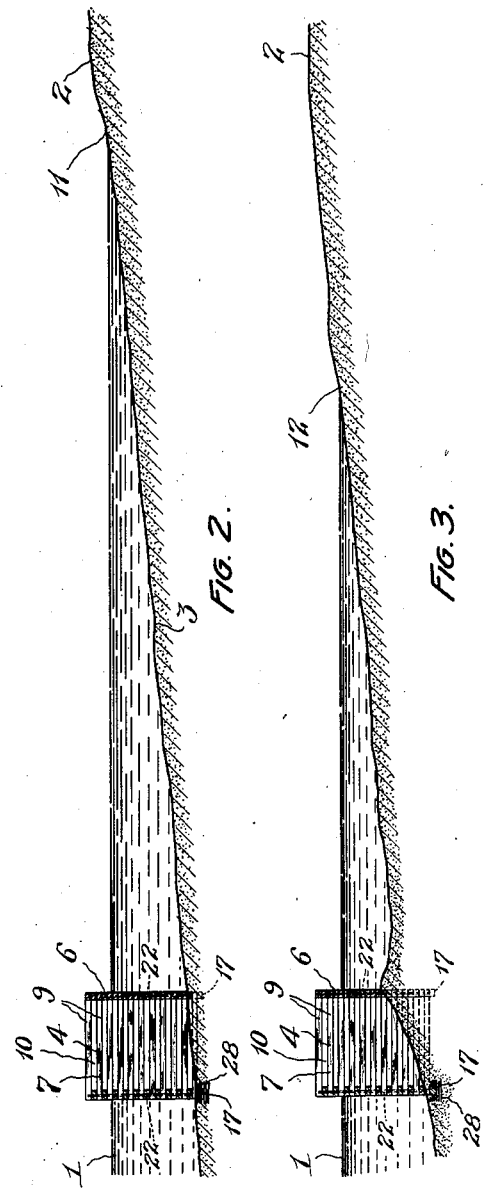
INVENTOR:
WILLIAM H. EVERS
BY
ATTORNEY

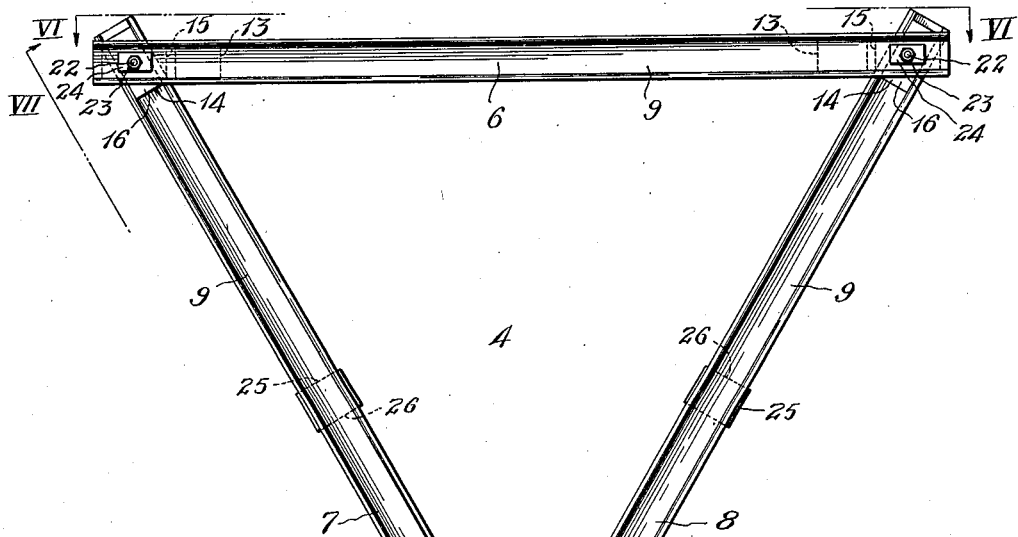
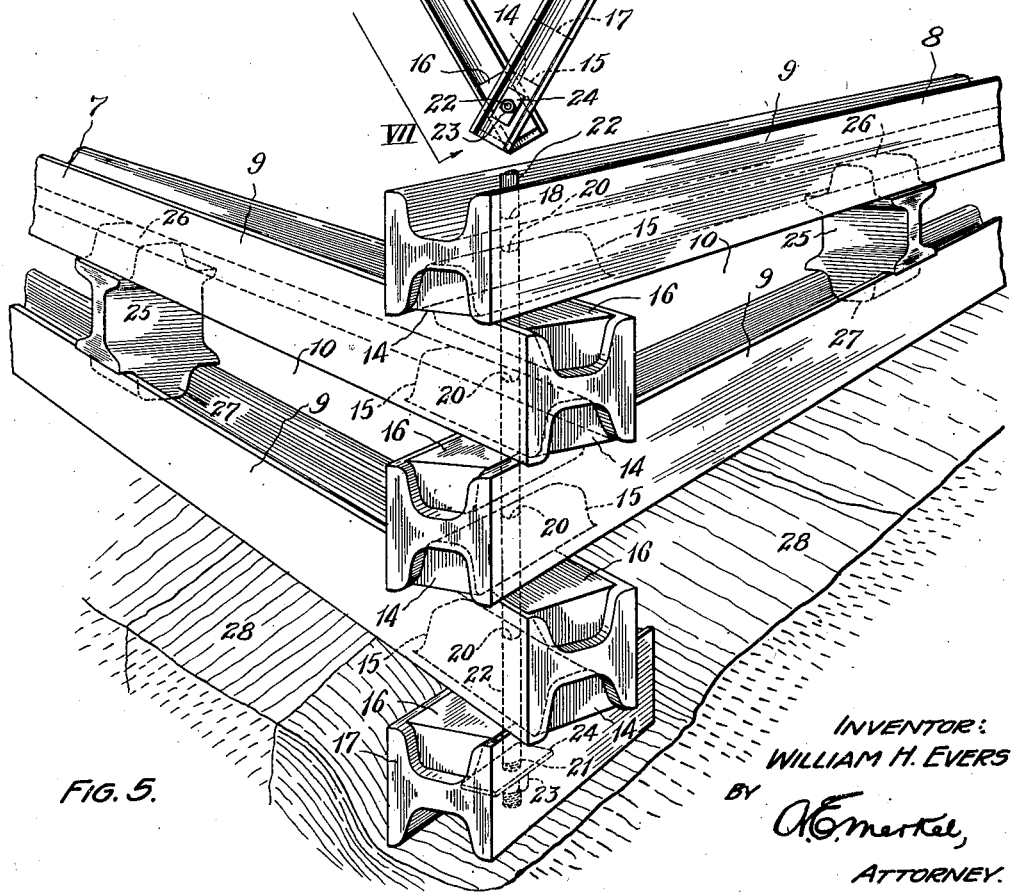

Mar. 3, 1925.
W. H. EVERS
SHORE PROTECTING SYSTEM
Filed Jan. 3, 1922   4 Sheets-Sheet 4
1,528,016
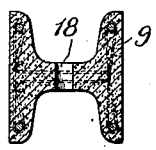
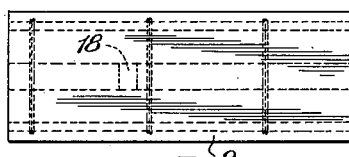
Fig. 11.  Fig. 9.
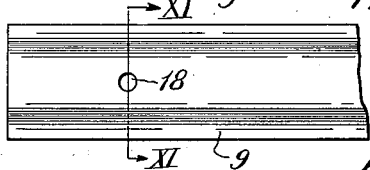
Fig. 10.
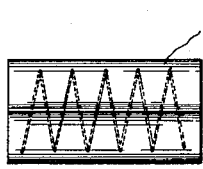
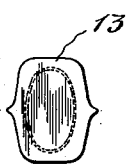
Fig. 14.  Fig. 15.  Fig. 16.
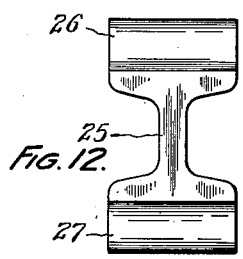
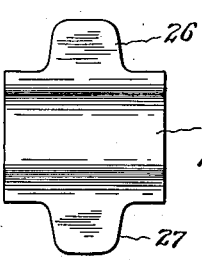
Fig. 12.  Fig. 13.
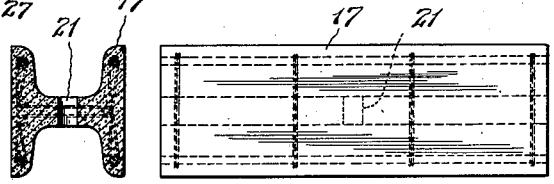
Fig. 18.  Fig. 17.
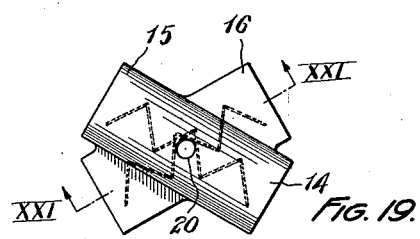
Fig. 19.
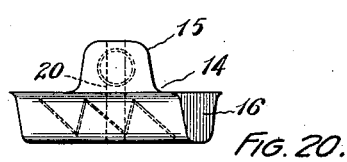
Fig. 20.
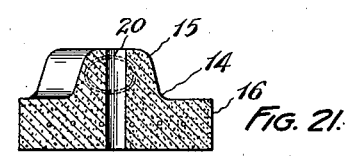
Fig. 21.
INVENTOR:
WILLIAM H. EVERS
BY
*Merkel,*
ATTORNEY.

Patented Mar. 3, 1925.

1,528,016

UNITED STATES PATENT OFFICE.

WILLIAM H. EVERS, OF LAKEWOOD, OHIO, ASSIGNOR OF ONE-THIRD TO WILLIAM E. PEASE AND ONE-THIRD TO NOAH H. SULOFF, BOTH OF CLEVELAND, OHIO.

SHORE-PROTECTING SYSTEM.

Application filed January 3, 1922. Serial No. 526,548.

*To all whom it may concern:*

Be it known that I, WILLIAM H. EVERS, a citizen of the United States, resident of Lakewood, county of Cuyahoga, and State of Ohio, have invented new and useful Improvements in Shore-Protecting Systems, of which the following is a specification, the principle of the invention being herein explained and the best mode in which I have contemplated applying that principle, so as to distinguish it from other inventions.

This invention relates to a short protecting system, more particularly a system designed to prevent corrosion of the shore by littoral currents created wherever prevailing storms are in a direction oblique to the shore line. Such conditions are particularly prevalent along the shores of the Great Lakes where in many localities beaches are being constantly worn away by the littoral currents which deposit the material in sand bars at varying distances from shore.

It is an object of the present invention to prevent such corrosive action and at the same time to build up a beach by causing incoming currents to deposit the solids carried in suspension therein along the shore line. A further object is to provide a breakwater construction which will not entirely cut off the normal currents and thus avoid the stagnant waters resulting from the breakwaters as heretofore designed.

Certain features of the cribwork construction herein disclosed which are capable of application generally to seawalls and breakwaters of various types, piers, docks, levees, dams and other partially submerged structures, are not claimed generically herein but are claimed in my copending applications Serial No. 526,549 and Serial No. 526,550, filed Jan. 3, 1922.

In the annexed drawings and following specification, I have set forth in detail certain means embodying my invention, the disclosed means, however, constituting but one of the various mechanical forms in which the principle of the invention may be employed.

In said annexed drawings:

Fig. 1 is a plan view of the shore and adjacent breakwater and jetties for forming a beach.

Fig. 2 is a section of the beach on line II—II of Fig. 1, at the time of installation of the system.

Fig. 3 is a section on the same line as Fig. 2 showing the built up beach after installation.

Fig. 4 is a plan view of one of the triangular cribwork breakwater or jetty units.

Fig. 5 is a perspective view showing the lower portion of the seaward corner of one of the cribwork units.

Figs. 9, 10 and 11 show the reinforced concrete H beam used in the cribwork units, in side elevation, plan and section, respectively.

Figs. 12, 13 and 14 are end and side elevations and a top plan view, respectively, of the header block which is used to reinforce the open cribwork intermediate the corners.

Figs. 15 and 16 are side and end elevations, respectively, of a positioner interposed between superposed beams in the solid wall of the cribwork.

Figs. 17 and 18 show the corner base beams in side elevation and transverse section, respectively.

Figs. 19 and 20 are a plan view and side elevation, respectively, of an interlocker for the crossing beams in the cribwork.

Fig. 21 is a section on line XXI—XXI of Fig. 19.

Figure 6:
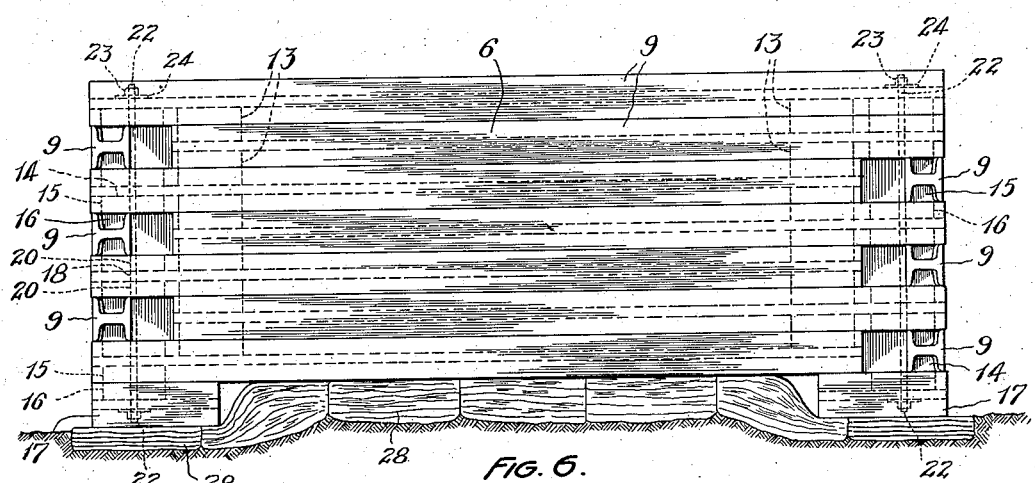
Fig. 6 is a rear elevation of one of the units viewed as indicated by line VI—VI in Fig. 4.

Referring to the annexed drawings in which the same parts are designated by the same reference numerals throughout, I have illustrated diagrammatically in Figs. 1, 2 and 3, a typical installation of my improved shore protecting and beach forming system. As shown in said figures, a body of water 1 has a shore 2 and a gradually sloping bottom 3 running out from the shore. To protect the shore and build up a beach I construct a breakwater a suitable distance from shore consisting of spaced triangular cribwork units 4 and, at suitable intervals along the shore line, I construct jetties 5 each consisting of a line of the triangular units 4. As shown in Figs. 2 and 3 each of the cribwork units 4 consists of a solid rear wall 6 placed substantially parallel with the shore line and open cribwork walls 7 and 8 extending seawards from the ends of the wall 6. The walls 7 and 8 consist of crossed courses of vertically spaced beams intersecting at their outer ends. The units 4 are partially submerged so that incoming waves strike the converging openwork walls 7 and 8 before they reach the solid back wall 6. The walls 7 and 8 which are built up of beams 9 arranged in courses intersecting at their forward ends to provide openings 10 substantially the whole length of both walls alternating with the beams thereof, present comblike faces to the incoming waves which serve to partially break up and materially lessen the impact of said waves against the rear wall 6. The wall 6 of the spaced units presents a solid smooth face to the onrushing waters and throws it in part back onto the incoming waves in the spaces between the units 4, thereby also helping to destroy the force of the waves passing to the rear of the breakwater and to retard the inward current therethrough. The ebb flow is also retarded by the rear walls 6 of the breakwater units 4. The effect of the breakwater is therefore to destroy the destructive force of the waves, retard the incoming currents and to establish an area of comparative calm between the breakwater and shore resulting in the deposit of solid material along the shore line. When the wind is in a direction oblique to the shore line littoral currents will be established between the breakwater and shore which if not retarded may corrode the shore. To counteract this tendency I build at suitable intervals, jetties 5 extending from the shore line toward the breakwater. Each jetty consists of a row of the cribwork units 4 and serves to retard the littoral currents along the shore line and prevent such corrosion.

In Fig. 1 the dotted line 11 shows the original shore line and the full line 12 shows the shore line some time after installation of the shore protection system. Figs. 2 and 3 show a section of the beach at the time of installation and at some time thereafter.

It will be understood that a general specification for shore protecting installations embodying this invention is impracticable owing to variation of tides, prevailing direction of storms, rise of storm waters, littoral currents and varying physical condition of shore, which differ at every locality. However, a careful examination by a matured engineer of these physical conditions will enable him to employ the principle of the present invention in an installation to successfully meet the requirements of the particular locality. As a typical example, however, I will set forth the specifications which have been adopted for one installation. The plan adopted was to build at 24 foot centers on a line parallel to the shore line in approximately 5 foot depth of water, a series of equilateral triangular bins with sides 12 feet long set on brush matting 12 inches thick and extending 6 feet from the outer edges of the triangle, the whole weighted down with hand stone and with sacked concrete, mixed dry, one part of cement to eight parts of coarse sand.

To check littoral currents back of the breakwater, a jetty 36 feet long consisting of the same triangular cribwork units was built out from the shore line at intervals of about 500 feet.

I shall now describe the details of what appears at present to be the preferred form of crib work construction which may be used in connection with the above described invention. These details of construction form, however, a separate invention and will be claimed in a separate application for U. S. Letters Patent which I intend to file therefor.

The construction of the cribwork units 4 is shown in detail in Figs. 4 to 21 inclusive. The entire cribwork is built up of reinforced concrete H beams 9 which are preferably all of the same length. In the example above given 12 foot beams are used. In the solid rear wall 6 the beams 9 are placed one on top of the other with their webs horizontal and the flanges of one resting on the flanges of the beam therebeneath, and with the ends of alternate beams staggered to provide spaces for the ends of the beams of the wave combing walls as clearly shown in Figs. 6 and 8. To interlock the superposed beams of the wall 6, short positioner blocks 13 of reinforced concrete which fit within the opposed channels of the superposed beams are interposed at suitable intervals between each pair of superposed beams from the bottom to the top of the wall 6. The beams of the side walls are positioned with their webs horizontal and with their rear ends positioned between the ends of alternate beams in the wall 6 in spaces provided by the staggered arrangement of the beams in said wall. The beams of one of the wave combing walls are thus positioned in the same plane as alternate beams in the wall 6 and the beams of the other wave combing wall are positioned in the plane of the alternate beams positioned between the beams of the first wave combing wall. The two courses of spaced beams forming the wave combing walls intersect at the forward ends of the beams with the beams of one wall alternating with those of the other wall. The beams of the wave combing walls 7 and 8 are interlocked with each other at the intersection of said walls and with the beams of the solid wall 6 by means of interlockers consisting of reinforced concrete X blocks 14 having upper and lower crossed legs 15 and 16 adapted to fit within the channels of the superposed crossed beams. The corners of the triangular cribwork units rest on short base beams 17 which are short sections of reinforced concrete H beams of the same size as the beams 9. The base beams 17 are arranged with their webs horizontal beneath the lowermost beam at each of the corners and interlocked with the H beam resting directly thereon by means of interlockers 14. Each of the beams 9 has an aperture 18 centrally through the web adjacent each end thereof and each of the interlockers 14 has an axial aperture 20 which is positioned in registry with the apertures 18 of the H beams which it engages. The base beam 17 has a central aperture 21 which registers with the aperture 20 of its interlocker 14. A tie bolt 22 extends vertically through the apertures 18 of the beam 20 of the interlockers and 21 of the base beam at each of the three corners of the unit. The ends of the tie bolts 22 are threaded to receive nuts 23 which are tightened against anchor plates 24 lying against the webs of the uppermost beams and of the base beams 17. The location of the ends of the tie bolts in the channels of the uppermost and lowermost beams makes it convenient to cover the projecting ends thereof with concrete. The entire bolt together with the projecting ends and anchor plates should be grouted in, preferably with a mixture of one part Portland cement to two parts of clean fine sand.

To provide the necessary support for the intermediate portions of the spaced H beams in the open-work walls and to more rigidly interlock the beams of said walls, I have provided headers, comprising short H shaped reinforced concrete blocks 25 having integral lugs 26 and 27 extending transversely across the upper and lower faces thereof and adapted to fit within the opposed channels of the spaced beams. The headers 25 serve to hold the side wall beams in vertical alinement and to support the beams intermediate their ends.

Figure 7:
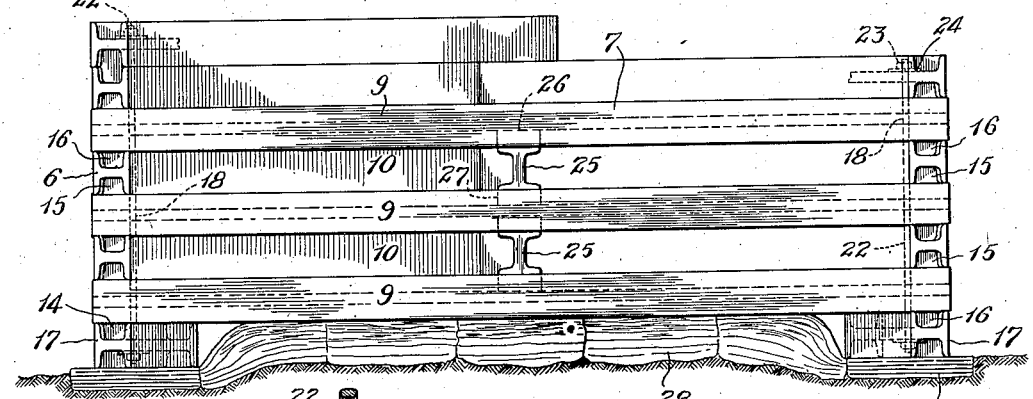
Fig. 7 is an oblique side elevation of one of the units, viewed as indicated by line VII—VII in Fig. 4.
Figure 8:
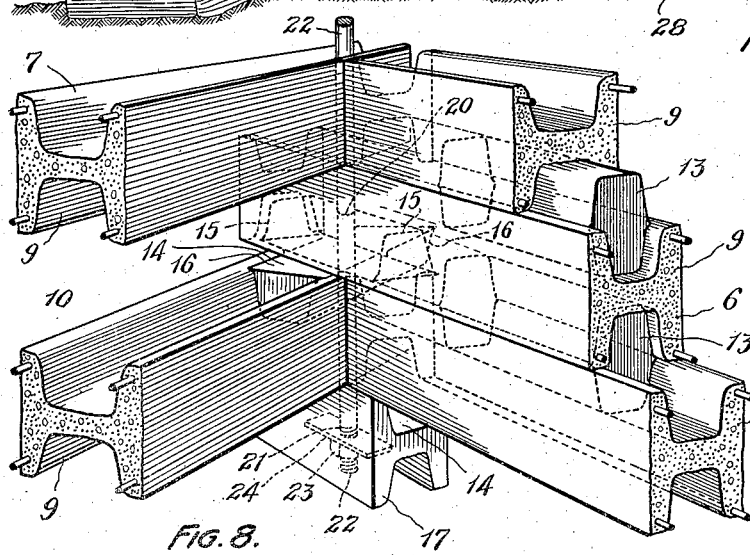
Fig. 8 is a perspective view of a lower rear corner of one of the cribwork units, looking from the inside.

The cribwork units 4 are preferably set upon brush mats 28 as shown in Figs. 5, 6 and 7. The short supporting beams 17 at the corners of the structure sink into the matting or soil and serve to anchor the units in position. If found desirable the units may be weighted down by piling rip rap stone or sacked cement within them. Such material, however, should not be piled high enough against the open-work walls 7 and 8 to interfere with the wave combing action thereof.

An advantage of the triangular construction of the breakwater units is that the apices of these triangular units on the seaward side serve to break up floating cakes of ice and prevent damage to the breakwater wall.

What I claim is:

1. In a shore protecting and beach forming system, the combination with a breakwater spaced from the shore line and extending substantially parallel therewith, said breakwater consisting of units spaced apart for admitting the water and currents restrictedly to the body of water between the shore and breakwater, and jetties at substantially right angles to the breakwater and located near the end portions of said breakwater, the outer ends of the jetties being spaced away from the outer portions of the breakwater whereby to provide passages for the currents out of the body of water confined between shore and breakwater, said jetties extending inwardly to and within the shore line.

2. A breakwater comprising a series of spaced partially submerged wave resisting units, each comprising a solid wall on the shore side thereof and an open cribwork of crossed beams extending outwardly from said solid wall.

3. A breakwater comprising a series of spaced partially submerged triangular wave resisting units, each having a solid wall on the shore side thereof, the other two walls extending outwardly from said solid wall and consisting of an open cribwork of crossed beams.

4. A breakwater comprising a series of spaced partially submerged triangular wave resisting units having a solid wall on the shore side thereof, the other two walls forming a wave combing structure and consisting of courses of vertically spaced beams interlocking with said solid wall adjacent the ends thereof and crossing adjacent their outer ends.

5. In a shore protecting system, the combination of a breakwater out from the shore line and extending therealong said breakwater consisting of spaced partially submerged wave resisting units, each comprising a triangular cribwork consisting of a solid wall on the shore side and two outwardly extending walls composed of vertically spaced beams forming a wave combing structure; and jetties extending from the shore toward said breakwater, said jetties each consisting of a line of triangular cribwork units.

Signed by me this 12th day of December, 1921.

WILLIAM H. EVERS.